United States Patent [19]

Deusser et al.

[11] Patent Number: 4,859,020
[45] Date of Patent: Aug. 22, 1989

[54] BRANCHING CIRCUIT FOR AN OPTICAL CABLE COMPRISING A PLURALITY OF OPTICAL WAVEGUIDES AND A METHOD OF PRODUCING SAME

[75] Inventors: Peter G. Deusser, Cologne; Detlef M. Boehm, Neunkirchen-Seelscheid; Karl W. Eiden, Bergisch-Gladbach; Johann A. Becker, Overath, all of Fed. Rep. of Germany

[73] Assignee: U.S. Philips Corp., New York, N.Y.

[21] Appl. No.: 94,223

[22] Filed: Sep. 17, 1987

[30] Foreign Application Priority Data

Sep. 9, 1986 [DE] Fed. Rep. of Germany ....... 3630659

[51] Int. Cl.$^4$ .............................................. G02B 6/36
[52] U.S. Cl. .............................................. 350/96.20
[58] Field of Search ............... 350/96.20, 96.21, 96.15, 350/96.22

[56] References Cited

U.S. PATENT DOCUMENTS

| | | | |
|---|---|---|---|
| 4,359,262 | 11/1982 | Dolan | 350/96.20 |
| 4,406,513 | 9/1983 | Raphael | 350/96.20 X |
| 4,500,166 | 2/1985 | Kunze | 350/96.20 |
| 4,601,536 | 7/1986 | Guazzo | 350/96.20 |
| 4,619,499 | 10/1986 | Gerber | 350/96.20 |
| 4,673,246 | 6/1987 | Schembri | 350/96.20 X |
| 4,729,625 | 3/1988 | Loscoe et al. | 350/96.21 |

FOREIGN PATENT DOCUMENTS 0158311  7/1981  Japan .
0169814  3/1985  Japan .

Primary Examiner—William L. Sikes
Assistant Examiner—Akm E. Ullah
Attorney, Agent, or Firm—Ernestine C. Bartlett

[57] ABSTRACT

The invention relates to a branching circuit for an optical cable comprising a plurality of optical waveguides in a cable sheath. In order to accomplish that, at low manufacturing costs, low additional attenuations are obtained, it is provided that a longitudinal section from which the cable sheath has been removed is fixed in a stretched condition in a branching box which extends on both sides beyond the end of the cable sheath and that an end of at least one severed optical waveguide or a branched-optical waveguide connected thereto is passed through a branching sleeve which is fitted to branching box, all as illustrated in FIG. 1.

19 Claims, 1 Drawing Sheet

BRANCHING CIRCUIT FOR AN OPTICAL CABLE COMPRISING A PLURALITY OF OPTICAL WAVEGUIDES AND A METHOD OF PRODUCING SAME

BACKGROUND OF THE INVENTION

The invention relates to a branching circuit for an optical cable comprising a plurality of optical waveguides in a cable sheath.

When in installed optical cables comprising a plurality of optical waveguides, at least one of these optical waveguides must be branched out to form a branching circuit, a considerable free length of this optical waveguide must be available to enable connection to the branched out optical waveguide or to the optical waveguide cable, respectively, to avoid, during mounting of a connector device or when a splice connection is made, bending the ends of the optical waveguide, which are sensitive to mechanical loads, to an impermissible degree.

It is also possible, as is customary for electric cables, to sever the optical cable in the branch point. According to this technique all of the optical waveguides must then be laid bare at both cable ends through a corresponding length, by removing the cable sleeve. Thereafter, the optical waveguides which will not be branched off must again be connected to a junction point. These numerous junction points require a significant mounting cost and cause additional attenuations.

SUMMARY OF THE INVENTION

An object of this invention is to structure a branching circuit for an optical cable comprising a plurality of optical waveguides in a cable sheath in such manner that it can be produced with little cost and design effort and wherein additional attenuations for the optical waveguides which are not to be branched off are prevented.

This object is accomplished by a method and resulting structure wherein cable sheath is removed from a longitudinal section of an optical cable; a longitudinal section from which the cable sheath has been removed is fixed in the stretched condition in a branching box which extends in both directions beyond the ends of the cable sheath; and wherein an end of at least one severed optical waveguide, or a branch-optical waveguide connected thereto, is passed through a branching sleeve fitted to the branching box. The branching sleeve is a tube which loosely fits around the optical waveguide and may be the cladding of a branched off optical cable.

The method and structure of the invention provides the advantages that the optical waveguides which are not to be branched off need not to be severed, so that the mounting expenditure is significantly reduced and moreover no additional attenuations can of course occur. The relative length of the bared section of the optical cable is determined and protected by the branching box.

Advantageously, the cable sheath is removed for a length of 150 to 250 mm in the region of the branching box.

In a preferred embodiment of the invention, the end of the optical waveguide located inside the branching box is coupled to the end of a branch-optical waveguide which is led through the branching sleeve in the branching box. Thus, the junction with the branch-optical waveguide within the branching box is also protected.

If a large length of, for example, more than 1 m is required for the ends of the optical waveguide to be branched off, which more specifically is the case when the connection to the branch-optical waveguide or the branch-cable, respectively, must be made outside the branching box at a distance therefrom, a further embodiment of the invention has been proved to be particularly advantageous wherein an optical cable severing region remote from the branching box is provided from which the cable sleeve is removed and in which the end of the optical waveguide leading from the branching box is cut through.

The severing region is preferably spaced from the branching box by 1000 to 2000 mm.

A particularly suitable method of producing a branching circuit in which the above-described additional cable severing region is used, is characterized in that sections of the cable sheath are removed in the region of the branching box and the cable severing region; that an optical waveguide is cut in the severing region; and its end is drawn through the intermediate length of the cable sheath into the branching box regions. Drawing the end of the optical waveguide is facilitated by the fact that prior to the drawing step at least one non-optical structural part is removed from the intermediate section of the cable sheath.

The remaining length of the cable severing region can be significantly reduced or be reduced to zero when the cable severing region is formed by simply cutting the cable sheath and pushing the intermediate section of the cable sheath in situ of the branching box, and when, after the end of the optical waveguide has been drawn through the intermediate section, this intermediate section is pushed to the opposite end of the cable sheet.

DESCRIPTION OF THE DRAWINGS

The invention and its advantages will now be described in greater detail with reference to preferred embodiments shown in the accompanying drawings.

DETAILED DESCRIPTION OF THE PREFERRED EMBODIMENTS

Figure 1:
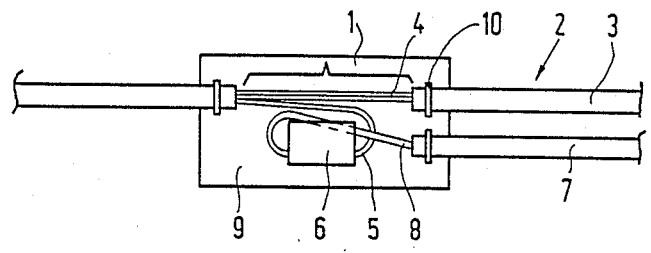
FIG. 1 shows schematically a first embodiment of the invention.

The cable sheath 3 is removed from the optical cable 2 through a longitudinal section 1, so that there the optical waveguides 4 are exposed. The end of the branched off optical waveguide 5 which is severed in the right hand part of the cable sheath 3 is connected via the connector element 6 to an associated branched-optical waveguide 8 which is fed forward through the branch sleeve 7. Since the optical waveguides 4 are not cut and extend in a straight line, no additional attenuation is produced in these waveguides.

The branch circuit sleeve 7 and also the ends of the cable sheath 3 are connected in a pull-proof manner to the base plate 9 of the branching box, which is shown in the various drawing by a clamp 10. The branching box is covered by, for example, a lid, in such manner that the exposed regions of the optical fibres 4, 5 and 8 are especially protected from outside influences.

Figure 2:
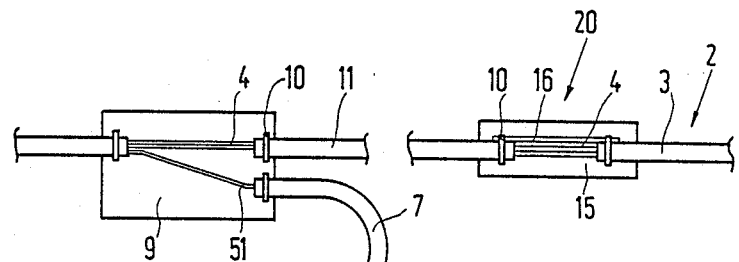
FIG. 2 shows schematically a second embodiment of the invention.

In the preferred embodiment of FIG. 2, components identical to those in FIG. 1 are given the same reference numerals. To ensure that particularly long ends of the optical waveguide 5 are available, without the necessity of increasing the length of the branching box, a cable severing region 20 is additionally provided, from which the cable sheath 3 is removed for a predetermined length, so that the optical waveguides 4 are also laid bare. The group 51 formed by optical waveguides which form, for example, a ribbon-shaped unit, is cut in the severing region 20. After having been drawn through the intermediate section 11 of the cable sheath 3 an optionally long end of the group 51 of the optical waveguide to be branched off is available, which in FIG. 2 is passed directly through the branch sleeve 7 into a separate connector box 12 which is remote from the branching box and is to conventionally constructed whereby the connections to the outgoing waveguides 13 and 14 are made by means of the connector element 61.

The cable severing region 20 may be protected by a cable severing box on whose base plate 15 the ends of the cable sleeve are fitted in a pull-proof manner, which is again denoted by clamps 10.

A pull-relief may also be transferred by the pull-proof straps 16 only which are fitted in that region to the two ends of the cable sheath 3. Under these conditions the housing of the severing box is only used for the purpose of covering the housing.

Drawing the group 51 of the optical waveguides to be branched off through the intermediate section is facilitated, without the optical waveguides being subjected to dangerous pulling forces, when at least one structural element, more specifically a central pull-relief element is removed from the intermediate section 11 of the cable sheath 3 prior to such drawing step.

Figure 3:
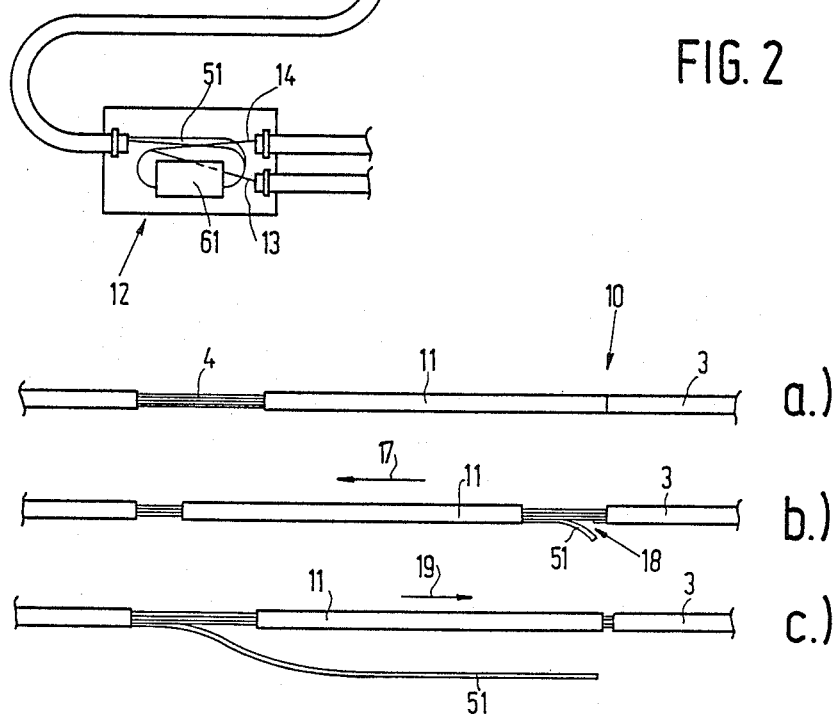
FIG. 3 shows optical cables from which the cable sheath is removed in the branch point and which have a further cable severing region in the different steps a, b and c of the method.

FIG. 3 illustrates the steps of the method whereby that in the cable severing region 20 only a minimal length of the optical fibre 4 remains without a covering sleeve.

First (stage a) only a simple, annular severing of the cable sleeve 3 is effected. Thereafter (stage b) the centre section 11 of the cable sheath 3 is pushed into the direction of the arrow 17 into the gap which was previously made for the branching circuit. Thereafter the group 51 of the optical waveguides to be branched off can be cut through in this spot denoted by 18. Thereafter (stage c) the intermediate section 11 is pushed back in the direction of the arrow 19 until the ends of the cable sheath 3 abut at least substantially. Now the ends of the groups 51 of the optical fibres can be drawn out of the intermediate section 11.

We claim:

1. A branching circuit for an optical cable comprising a plurality of optical waveguides in a cable sheath, characterized in wherein a longitudinal section from which the cable sheath has been removed is fixed in the stretched condition in a branching box which extends in both directions beyond the ends of the cable sheath and an end of at least one severed optical waveguide or a branch-optical waveguide connected thereto is passed through a branching sleeve fitted to the branching box.

2. A branching circuit as claimed in claim 1, characterized wherein in the region of the branching box the cable sleeve is removed for a length of 150 to 250 mm.

3. A branching circuit as claimed in claim 2, wherein the end of the optical waveguide within the branching box is coupled to the end of a branch-optical waveguide which is passed through the branch sleeve in the branching box.

4. A branching circuit as claimed in claim 2, wherein remote from the branching box a cable severing region is provided from which the cable sleeve has been removed, within which the end of the optical waveguide outgoing from the branching box is cut off.

5. A branching circuit as claimed in claim 1, wherein the end of the optical waveguide within the branching box is coupled to the end of a branch-optical waveguide which is passed through the branch sleeve in the branching box.

6. A branching circuit as claimed in claim 3, wherein remote from the branching box a cable severing region is provided from which the cable sleeve has been removed, within which the end of the optical waveguide outgoing from the branching box is cut off.

7. A branching circuit as claimed in claim 1, wherein remote from the branching box a cable severing region is provided from which the cable sleeve has been removed, within which the end of the optical waveguide outgoing from the branching box is cut off.

8. A branching circuit as claimed in claim 4, wherein in the cable severing region the ends of the cable sheath are interconnected by means of a pull-relief element which encloses both ends of the cable sheath in a pull-proof manner.

9. A branching circuit as claimed in claim 4 wherein the cable severing region is spaced 1000 to 2000 mm from the branching box.

10. A method for producing a branching circuit for an optical cable which comprises:
   providing at least one optical cable containing a plurality of optical waveguides within a cable sheath;
   providing a branching box comprising a base plate and a cover, said branching box extending in both directions beyond the ends of the cable sheath and having a branching sleeve fitted thereto;
   removing the cable sheath from a longitudinal section of said optical cable to lay bare a longitudinal section of optical waveguides contained in said optical cable;
   fixing said bared longitudinal section in stretched condition in said branching box; and
   severing at least one of said optical waveguides and passing said severed end through the branching sleeve fitted to the branching box.

11. A method as claimed in claim 10, wherein the end of the optical waveguide passed through the branching sleeve is coupled to the end of a branch-optical waveguide which is passed through the branching sleeve in the branching box.

12. A method as claimed in claim 10, wherein remote from the branching box a cable severing region is provided in which the cable sheath is substantially removed and within which the end of the optical waveguide outgoing from the branching box is cut off.

13. A method of producing a branching circuit as claimed in claim 12, wherein the sections of the cable sheath are removed in the region of the branching box and the cable severing region, at least one optical waveguide is cut through in the cable severing region and ends thereof are pulled through the intermediate section of the cable sheath in the region of the branching box.

14. A method of producing a branching circuit as claimed in claim 12, wherein the cable severing region is spaced 1000 to 2000 mm from the branching box; the sections of the cable sheath are removed in the region of the branching box and the cable severing region; at least one optical waveguide is cut through in the cable severing region and ends thereof are pulled through the intermediate section of the cable sheath in the region of the branching box.

15. A method as claimed in claim 12, wherein in the cable severing region the ends of the cable sheath are interconnected by means of a pull-relief element which encloses both ends of the cable sheath in a pull-proof manner.

16. A method of producing a branching circuit as claimed in claim 15, wherein the sections of the cable sheath are removed in the region of the branching box and the cable severing region; at least one optical waveguide is cut through in the cable severing region; and ends thereof are pulled through the intermediate section of the cable sheath in the region of the branching box.

17. A method as claimed in claim 7 wherein the cable severing region is formed by cutting the cable sheath and pushing the intermediate section of the cable sheath to the region of the branching box, and after the ends of the optical waveguides have been pulled through the intermediate section this intermediate section is pushed against the opposite end of the cable sheath.

18. A method as claimed in claim 7, wherein prior to drawing the end of the optical waveguide through the intermediate section at least one non-optical structural element is removed from the intermediate section of the cable sheath.

19. A method as claimed in claim 8, wherein the cable severing region is formed by cutting the cable sheath and pushing the intermediate section of the cable sheath to the region of the branching box, and after the ends of the optical waveguides have been pulled through the intermediate section this intermediate section is pushed against the opposite ends of the cable sheath.

* * * * *